United States Patent [19]

Paul et al.

[11] Patent Number: 4,545,410

[45] Date of Patent: Oct. 8, 1985

[54] SYSTEM FOR TRANSFERRING DRY FLOWABLE MATERIAL

[75] Inventors: Kermit D. Paul, Henderson; Charles F. Addams, Jr.; Frederick S. Wuertele, both of York, all of Nebr.

[73] Assignee: Cyclonaire Corporation, Henderson, Nebr.

[21] Appl. No.: 575,179

[22] Filed: Jan. 30, 1984

[51] Int. Cl.$^4$ .............................................. B65B 1/04
[52] U.S. Cl. ...................................... 141/18; 141/67; 141/98; 406/3; 406/30
[58] Field of Search ................. 406/3, 30; 141/67, 68, 141/98, 1–12, 18–29, 250–284

[56] References Cited

U.S. PATENT DOCUMENTS

| | | | |
|---|---|---|---|
| 2,880,036 | 3/1959 | Larsson et al. | 302/17 |
| 3,115,278 | 12/1963 | Mylting | 222/56 |
| 3,372,958 | 3/1968 | Black | 302/53 |
| 3,378,310 | 4/1968 | Christensen | 302/17 |
| 3,861,830 | 1/1975 | Johnson | 417/149 |
| 4,168,864 | 9/1979 | Weeks | 406/23 |

*Primary Examiner*—Houston S. Bell, Jr.
*Attorney, Agent, or Firm*—Welsh & Katz

[57] ABSTRACT

A system for transferring dry flowable material includes a substantially closed vessel having an inlet and a discharge end. A cycle valve and venturi are arranged between a source of fluid pressure and the vessel such that the cycle valve may be selectively actuated to pass pressurized fluid directly to the vessel or through the venturi. A suction line interconnects the vessel to the throat section of the venturi such that passage of fluid flow through the venturi establishes a suction within the vessel. A pressure responsive control switch has direct communication with the throat of the venturi so as to detect the fluid pressure therein and is operative in response to a predetermined pressure within the venturi to condition the cycle valve for effecting a suction within the vessel sufficient to substantially fill the vessel with material, after which material is sucked into the venturi to cause a change in fluid pressure therein such that the pressure responsive control switch causes the cycle valve to pressurize the vessel and effect discharge of material therefrom. The cycle valve and pressure responsive control switch effect automatic cyclical fill and discharge of the vessel.

9 Claims, 7 Drawing Figures

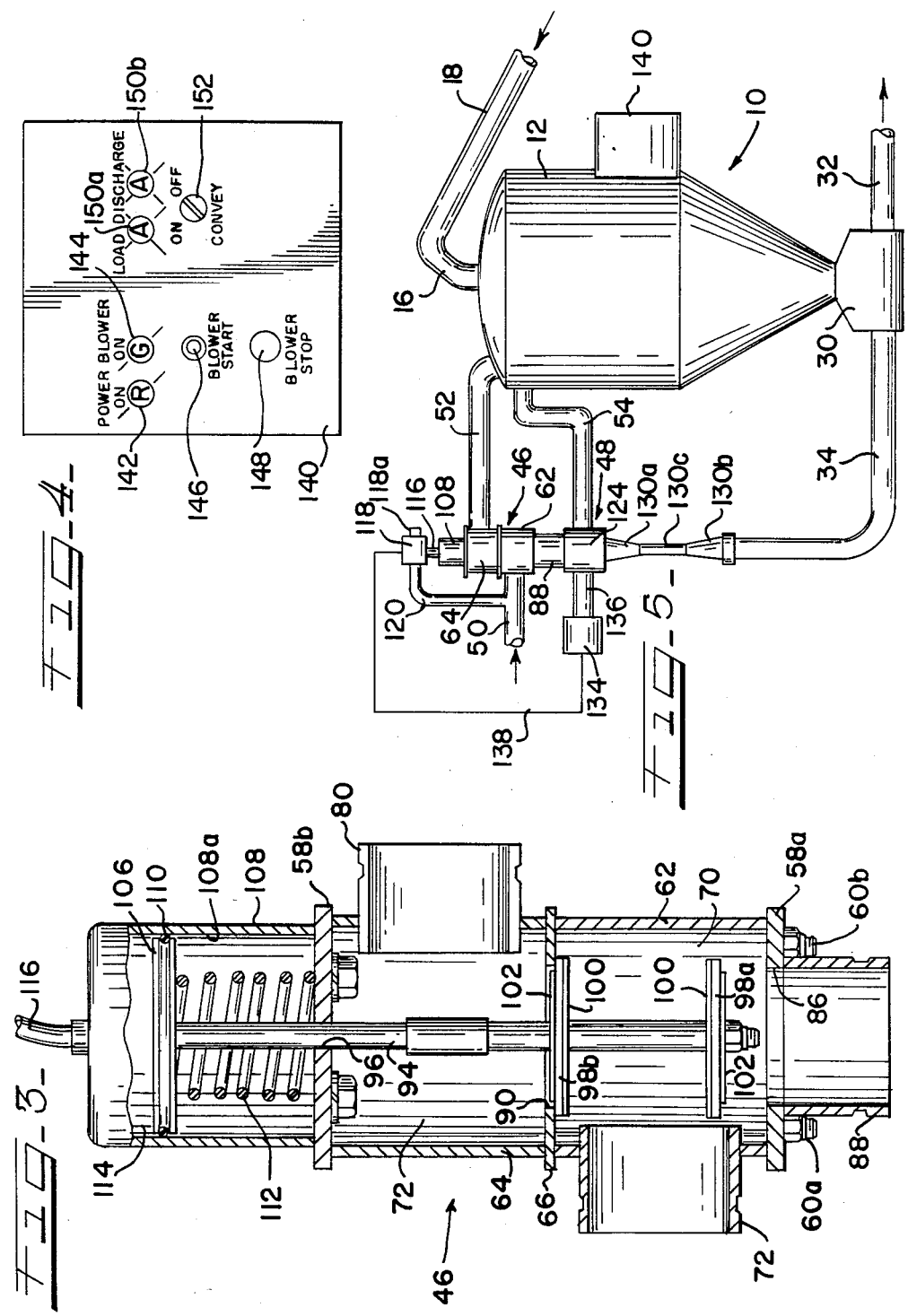

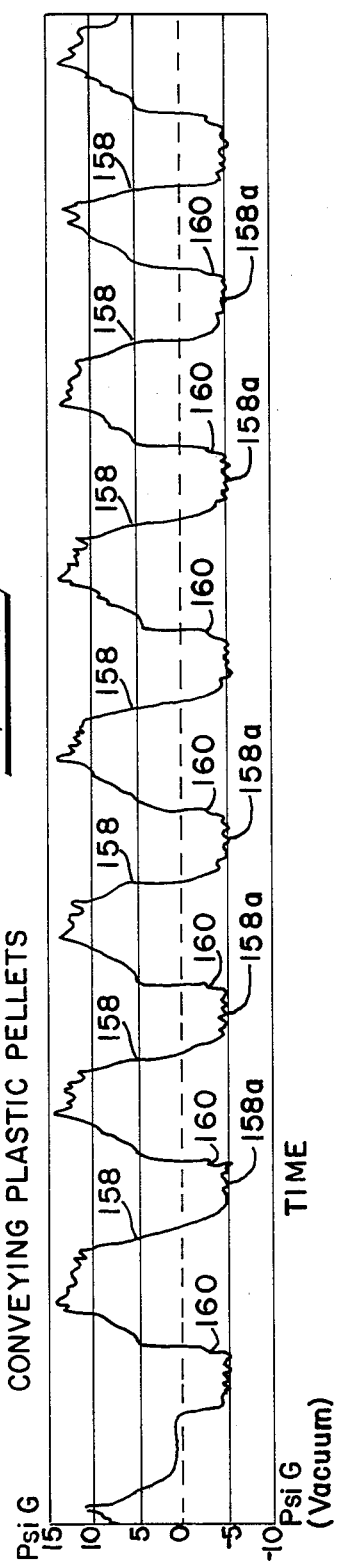
FIG-6-
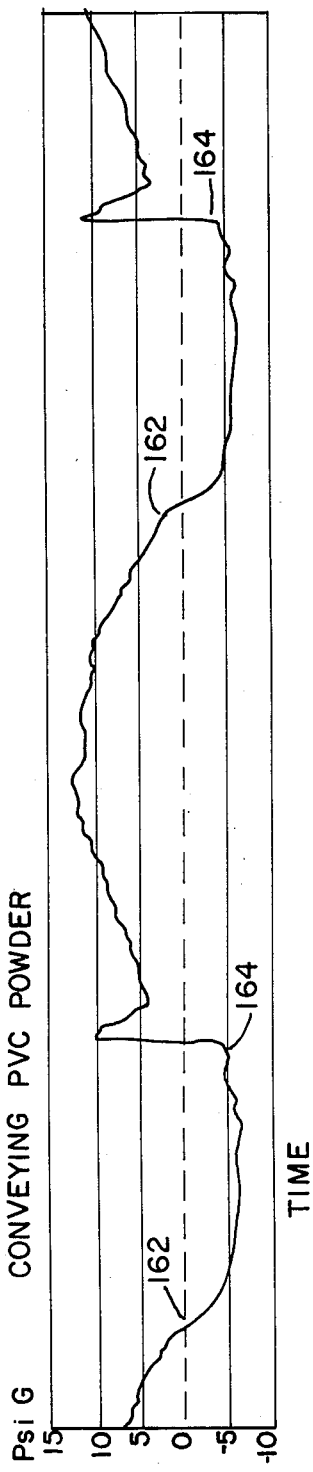
FIG-7-

4,545,410

SYSTEM FOR TRANSFERRING DRY FLOWABLE MATERIAL

BACKGROUND OF THE INVENTION

The present invention relates generally to systems for transferring dry free flowing bulk products in the form of powders or granules or the like, and more particularly to such a system employing a novel valving and control arrangement operative to automatically cycle the system between alternate fill and discharge cycles in a highly efficient and economical manner.

Systems for transferring bulk products, and particularly relatively dry flowable particulate or pulverulent materials are generally known. Such systems generally employ a substantially closed vessel or tank having an inlet opening through which the particulate material may be drawn from a source, such as the hold of a ship or a railcar, after which the flowable material is discharged at a discharge outlet for transfer by way of a pneumatic flow line or the like to a different location such as a storage silo. See, for example, U.S. Pat. Nos. 3,372,958 to R. R. Black and 3,861,830 to R. D. Johnson. The systems disclosed in these patents operate on the principle of creating a vacuum or suction within the vessel to effect input loading of flowable particulate or pulverulent product into the vessel or tank until the vessel is substantially full at which time a positive fluid pressure is introduced into the vessel so as to force the material from the discharge outlet into a discharge line in which the material is pneumatically conveyed to a remote storage facility. Such filling and discharge of the vessel is effected automatically in an alternating cyclical manner by means of a valving control arrangement operative to alternately apply suction and pneumatic pressure to the vessel.

While the prior systems have provided generally satisfactory operation, they employ rather complex structural arrangements which add significantly to the costs of such systems and lead to substantial down time in the event of malfunction or maintenance requirements. A more significant disadvantage exhibited by the prior systems, such as disclosed in the aforementioned Johnson patent, is that they rely on timer controls for either one or both of the fill and discharge cycles and thus must be continually monitored and adjusted to accommodate changes in the particular material being transferred, changes in elevation between the transfer system vessel and the storage hold or railcar from which material is drawn, and changes in length of the various lines or conduits through which the material is drawn into the transfer vessel and subsequently discharged.

SUMMARY OF THE INVENTION

One of the primary objects of the present invention is to provide a system for transferring dry flowable particulate and pulverulent non-abrasive materials between locations which employs a novel control arrangement for automatically cycling a system transfer vessel between fill and discharge cycles in direct response to changes in efficiency of a venturi during both fill and discharge cycles.

A feature of the system in accordance with the invention lies in the utilization of a cycle valve controlled in response to the efficiency of an associated venturi so as to effect alternate cycling between fill and discharge modes within the associated transfer vessel, thus eliminating the need for electronic level controls and separate suction control valves as have heretofore been employed.

Another feature of the invention lies in the utilization of a pressure sensitive electrical switch having direct communication with the venturi employed to draw a vacuum within the transfer vessel such that predetermined changes in efficiency of the venturi when the vessel reaches its substantially filled and substantially empty conditions operate to actuate the pressure sensitive switch and effect automatic change between fill and discharge operating modes.

Further objects, advantages and features of the invention, together with the manner of operation thereof, will become apparent from the following detailed description of the invention when taken in conjunction with the accompanying drawings wherein like reference numerals designate like elements throughout the several views.

BRIEF DESCRIPTION OF THE DRAWINGS

FIG. 3 is an enlarged longitudinal sectional view of the control valve employed in the system illustrated in FIG. 1;

FIG. 4 is an elevational view illustrating the control panel mounted on the transfer vessel;

FIG. 5 is a schematic diagram of the various components of the system of FIG. 1;

FIG. 6 graphically depicts the pressure within the transfer vessel in relation to time during cyclical loading and discharge of particulate material in the form of plastic pellets; and FIG. 7 graphically depicts pressure within the transfer vessel in relation to time during cyclical loading and discharge of a powdered material.

DETAILED DESCRIPTION OF PREFERRED EMBODIMENT

Figure 2:
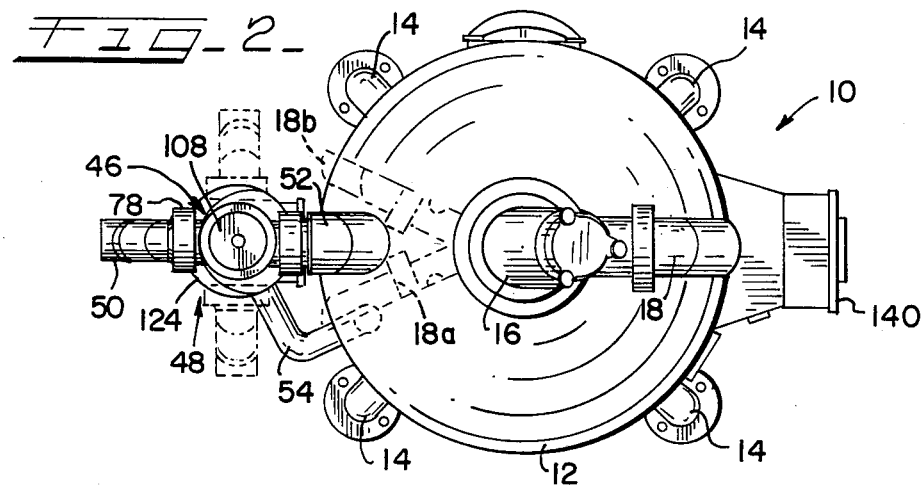
FIG. 2 is a plan view of the system of FIG. 1 with various components being shown in varied positions in phantom.
Figure 1:
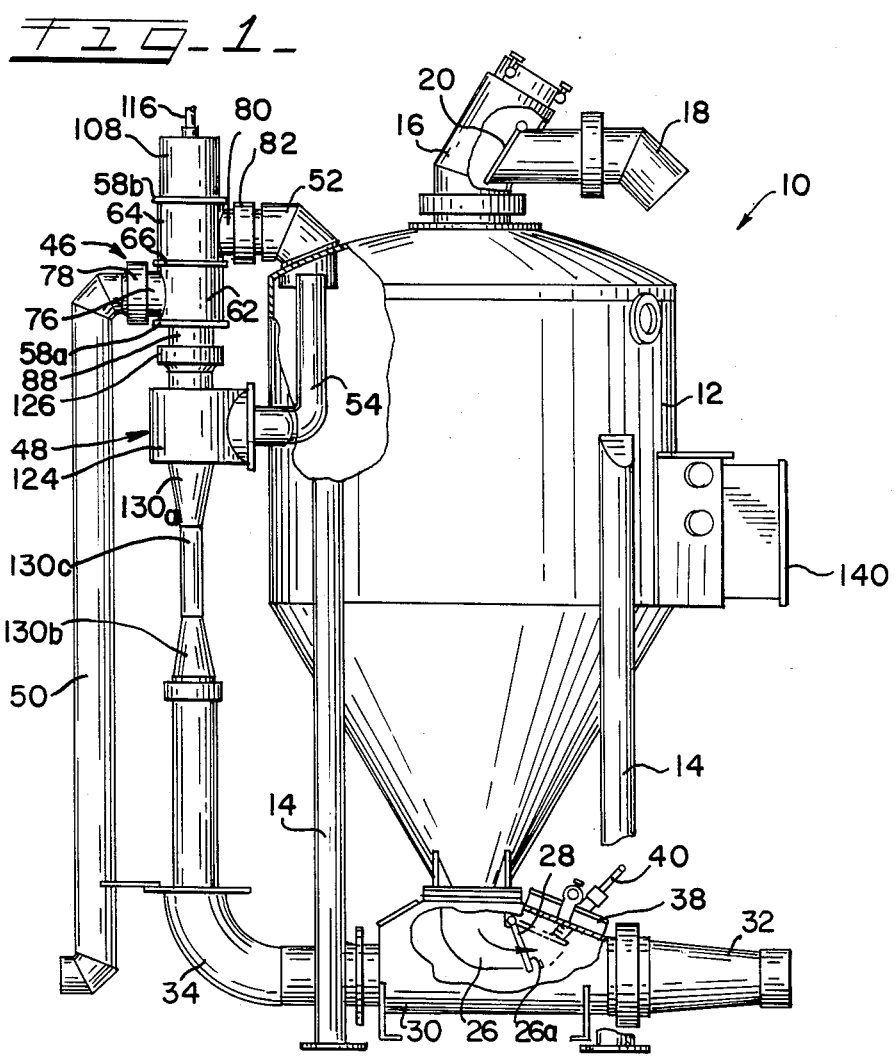
FIG. 1 is a side elevational view of a system for transferring dry flowable particulate and pulverulent materials in accordance with the present invention, portions being broken away for purposes of clarity.

Referring now to the drawings, and in particular to FIGS. 1 and 2, a system for use in transferring non-abrasive dry bulk material in the form of dry flowable particulate or pulverulent material in accordance with the present invention is indicated generally at 10. As used herein, the term flowable material refers to both flowable particulate materials, such as plastic pellets and the like, and flowable pulverulent materials, such as powdered materials, capable of transfer by fluid pressure flow as in pneumatic flow conveyor or transfer systems.

The system 10, which may alternatively be termed transfer apparatus, is operative to transfer the flowable material in intermittent or cyclical increments and includes a generally conical substantially closed vessel or pressure pot 12 which is supported on suitable upstanding support legs 14 such that the longitudinal axis of the vessel is substantially vertical. The vessel 12 has an inlet 16 at its uppermost end which defines an inlet opening to the vessel 12 coincident with its longitudinal axis and which has an inlet or vacuum conduit 18 adapted for connection to one end of a length of vacuum hose (not shown) enabling material input to the vessel from a source of flowable material such as a railcar or the hold of a ship or the like for transfer to a second location. The vacuum hose to which the conduit 18 is connected is preferably no more than approximately twenty feet in length. In the illustrated embodiment, the inlet 16 has a swivel connection to the vessel 12 so as to enable the associated inlet or vacuum conduit 18 to be rotated about the longitudinal axis of the vessel between a range as indicated by the phantom lines 18a and 18b in FIG. 2. An inlet flap valve 20 is hingedly connected to the innermost end of the inlet conduit 18 within inlet 16 and is biased by gravity to a closed position over the inclined end of the inlet conduit. As will be described, the flap valve 20 may be readily opened to facilitate inputting of flowable material into the vessel 12 when the vessel is subjected to suction during each fill cycle of the vessel.

In the illustrated embodiment, approximately the upper one-half of the vessel 12 is generally cylindrical and the lower one-half is frustoconical and terminates at its lower end in an elbow-shaped outlet or discharge end 26 having a free edge 26a which lies in a plane inclined to vertical. A flap valve plate 28 similar to the flap valve 20 is hingedly connected to the outlet 26 so as to be biased by gravity to a closed position over the inclined edge 26 of the outlet. The discharge outlet 26 and associated flap valve 28 are disposed within a substantially closed housing or manifold 30 having its opposite ends connected, respectively, to a frustoconical shaped outlet conduit 32 and an elbow-shaped flow conduit 34. The outlet conduit 32 facilitates connection of the system 10 to a tubular conveying line or conduit leading to a remote transfer point or storage facility. Preferably, an access opening is provided in the manifold housing 30 to enable access to the flap valve 28. The access opening is closed by a releasable closure cover 38 which carries an adjustable stop 40 extending downwardly into the manifold 30 so as to enable selective control of the extent of outward opening of the flap valve 28.

Filling of the vessel 12 with flowable material through the inlet 16 and discharge of the material through the outlet 26 is effected in an alternating or intermittent manner by establishing a suction within the vessel when it is substantially empty and maintaining the suction until the vessel has been substantially filled with flowable material after which a positive fluid pressure is introduced into the upper region of the vessel of sufficient magnitude to effect discharge of the flowable material from the vessel into the manifold 30 and discharge conduit 32. To this end, the system 10 includes a cycle valve, indicated generally at 46, which is operatively associated with a venturi assembly, indicated generally at 48, and is interposed between a fluid pressure inlet conduit 50 and an elbow-shaped pressure conduit 52 connected directly to the upper end of the vessel 12 in communicating relation therewith. The cycle valve 46 is also interposed between the pressure inlet conduit 50 and a suction conduit 54 which is connected between the venturi assembly 48 and the upper end of the vessel 12 independent of the pressure conduit 52. The fluid pressure inlet conduit 50 is connected to a suitable source of fluid pressure, such as a positive displacement blower (not shown), operative to pass a gas under pressure, such as air at 15 psi gage, through conduit 50 to the valve assembly 46.

Referring particularly to FIG. 3, taken in conjunction with FIGS. 1 and 2, the cycle valve 46 includes a pair of substantially parallel circular end plates 58a and 58b which are maintained in interconnected axially aligned relation through a plurality of connecting bolts, two of which are indicated at 60a and 60b. The end plates 58a,b and associated connecting bolts maintain a pair of generally equal size annular walls 62 and 64 and an intermediate circular plate 66 in assembled relation such that the annular walls and intermediate plate are axially aligned with the end plates 58a,b and define first and second cylindrical valve chambers 70 and 72. Sealing O-rings are disposed within suitable annular grooves in each of the annular end surfaces of the annular walls 62, 64 and cooperate with the associated plates 58a,b and 66 to maintain fluid tight seals while enabling rotational adjustment of the walls 62, 64 upon selective loosening of the connecting bolts 60a,b, etc.

A cylindrical connector sleeve 76 is affixed within a suitable opening in the annular wall 62 so as to communicate with the valve chamber 70 and is connected to the fluid pressure conduit 50 through an annular coupling 78 (FIG. 1). A similar connector sleeve 80 is secured within a suitable opening in the annular wall 64 so as to communicate with the valve chamber 72 and is connected to the pressure conduit 52 through an annular coupling 82.

The end plate 58a has a circular opening 86 centrally therethrough which defines a first valve port communicating with a connector sleeve 88 affixed to plate 58a. Connector sleeve 88 provides means for interconnecting the cycle valve 46 to the venturi assembly 48, as will be described. The intermediate valve plate 66 has a circular opening 90 centrally therethrough which defines a second valve port between the valve chambers 70 and 72. A valve stem 94 has its upper end slidable within a suitable opening 96 formed centrally in the end plate 58b and extends coaxially within the annular walls 62 and 64 so as to enable longitudinal movement of the valve stem within the valve chambers 70 and 72. The valve stem 94 carries a pair of circular substantially identical transverse valve members 98a and 98b thereon each of which is preferably made of a suitable elastomeric valve material, such as rubber or a suitable plastic. Each of the valve members 98a,b is maintained between corresponding pairs of relatively rigid circular backing plates 100 and 102 fixed on the valve stem 94. The circular backing plates 102 are sized to enable them to be received within their corresponding valve ports 86 and 90 and establish annular sealing surface areas on the associated valve members 98a,b for contact with the plates 58a and 66, respectively, thereby enabling selective opening and closing of the ports 86 and 90 upon longitudinal movement of the valve stem 94.

To effect longitudinal movement of the valve stem 94 and valve members 98a,b, a circular piston 106 is fixed tansversely on the upper end of the valve stem. The outer peripheral surface of the piston 106 has sliding relation with an internal cylindrical surface 108a on a cap housing 108 which is fixed to the end plate 58b in coaxial relation thereon. Preferably, a sealing O-ring 110 extends about the periphery of the piston 106 to provide sealed relation with the cylindrical wall surface 108a. A coil compression spring 112 is interposed between the end plate 58b and the piston 106 so as to bias the piston 106 upwardly to a position wherein the valve member 98b closes the valve port 90 and valve member 98a is spaced from port 86.

The piston 106 cooperates with the upper end of the cap housing 108 to define a pressure chamber 114 which communicates with the fluid pressure inlet conduit 50 through control means including a fluid pressure conduit 116 connected between pressure chamber 114 and a 3-way solenoid valve 118 (FIG. 5). The solenoid valve 118 is connected through a fluid pressure control conduit 120 to the fluid pressure inlet 50. The solenoid valve 118 is normally positioned, when not energized, to connect the pressure chamber 114 to atmosphere, as through an exhaust port 118a (FIG. 5), and is operative when energized to connect the pressure chamber 114 to the fluid pressure inlet conduit 50 so as to enable inlet pressure, such as 15 psi, to be introduced into the pressure chamber 114. The compression spring 112 is selected such that when fluid pressure of approximately 12-15 psi is introduced into the pressure chamber 114, the piston 106 and associated valve stem 94 are moved downwardly to effect closing of valve port 86 and opening of valve port 90. In this manner, cyclical pressurizing of the pressure chamber 114 is operative to effect fluid pressure flow from the inlet conduit 50 alternately through port 86 and the associated connector sleeve 88 while closing port 90, and then through port 90 to the fluid pressure inlet conduit 52 into vessel 12 while closing port 86. It will be understood that such alternate opening and closing of ports 86 and 90 could be accomplished by a single valve member disposed within chamber 70 and carried on the valve stem 94 providing the longitudinal stroke of the valve stem is of sufficient length or the valve plates 58a and 66 are spaced close enough together.

As aforementioned, the connector sleeve 88 facilitates connection of the cycle valve 46 to the venturi assembly 48. To this end, and with particular reference to FIGS. 1 and 3, the venturi assembly 48 includes a generally circular cylindrical housing 124 to which the suction or vacuum conduit 54 is connected. The housing 124 houses a conventional venturi (not shown) the inlet end of which is connected to the connector sleeve 88 through an annular coupling 126. The venturi includes a reduced diameter throat or restricted flow area which is in communication with the suction conduit 54 through a secondary port intersecting the restricted throat area of the venturi such that fluid flow through the venturi from port 86 creates a predetermined pressure drop in the throat of the venturi sufficient to establish a suction action within conduit 54.

The downstream or discharge end of the venturi within housing 124 is connected to a mixing chamber which includes a converging conduit portion 130a and a diverging conduit portion 130b interconnected through a reduced diameter generally straight cylindrical tubular portion 130c. The mixing chamber serves to effect mixing of fluid flow streams derived from fluid pressure flow through port 86 and from the suction conduit 54 during a fill cycle of the vessel 12. The discharge end of the mixing chamber is connected through an additional flow conduit to the elbow conduit 34 which, as aforedescribed, interconnects to the manifold 30 such that fluid pressure flow through conduit 34 passes downstream from the discharge end 26 of the vessel 12 through the outlet conduit 32.

Assuming the material input conduit 18 to be connected to a source of dry non-abrasive flowable material, such as the hold of a ship or a railcar, and that the vessel 12 is initially empty, the cycle valve 46 is conditioned to open port 86 and close port 90 as shown in FIG. 3. In this condition, pressurized fluid flow, such as air at 15 psi gage, passes into the valve chamber 70 and through port 86 to and through the venturi within housing 124. Such flow is established to effect a suction condition within conduit 54 which is connected to the upper region of the vessel 12 so as to create a suction condition within the vessel sufficient to cause flap valve 20 to open and draw flowable material into the vessel 12. As the vessel 12 reaches a condition where it is substantially filled with flowable material, the material is sucked through the suction conduit 54 and enters the restricted flow area or throat of the venturi so as to substantially reduce the efficiency of the venturi. Stated alternatively, as material from the vessel 12 is sucked into the venturi throat, a pressure increase takes place within the throat (i.e. the normal fluid pressure drop within the throat area is reduced).

In accordance with an important feature of the present invention, the change in efficiency of the venturi, that is, the pressure change within the restricted throat area, is detected by a pressure responsive electrical switch 134 (FIG. 5) which is of conventional design and is interconnected to the throat area of the venturi within housing 126 through a secondary port by means of a fluid pressure flow conduit 136. The pressure responsive switch 134 is electrically connected to the solenoid valve 118 through a suitable electrical conductor 138.

During the fill cycle of vessel 112, the pressure switch 134 is responsive to a predetermined drop in efficiency of the venturi, i.e. a predetermined increase in pressure within the restricted flow area of the venturi due to flowable material entering the venturi throat from line 54, to close a pair of normally open contacts (not shown) and effect energizing of the solenoid 118 so as to enable inlet pressure from the pressure conduit 50 to enter the pressure chamber 114 and move the valve members 98a and 98b to positions wherein port 86 is closed and port 90 is open. It will be understood that piston 106 could comprise a suitable diaphragm of known design fixed at its center to the valve stem 94 and fixed as its periphery to the inner surface of the cap housing 108 so as to define the pressure chamber 114.

Upon closing port 86 and opening port 90 in the cycle valve, fluid pressure from conduit 50 passes directly into vessel 12 through the pressure inlet conduit 52 so as to pressurize the vessel and cause flowable material therein to open the flap valve 28 and discharge from the discharge end 26 into the manifold 30 and discharge conduit 32. Since the suction conduit 54 is in open communication with the interior of vessel 12, air pressure introduced into the vessel also passes through conduit 54 into the secondary port or throat of the venturi, through the mixing chamber 130a,b and c and through conduit 34 so as to provide an air stream ino the manifold housing 30 for fluidized intermixing with the material discharged from outlet 26 of vessel 12 and pneumatic conveying of the flowable material through conduit 32. As vessel 12 empties, a substantial pressure drop is detected within the secondary port or throat of the venturi by the pressure responsive switch 134 which is thereby actuated to deenergize solenoid 118 and revert it to a condition wherein the flow conduit 120 is blocked off and the pressure chamber 114 is open to atmosphere through port 118a. With the pressure chamber 114 connected to atmosphere, the biasing compression spring 112 moves the valve members 98a,b to positions opening port 86 and again closing port 90. This condition causes air pressure to again pass through port 86 and the venturi within housing 126 to establish suction within vessel 12 through suction conduit 54 so as to open the flap valve 20 and again effect input of flowable material into the vessel. In this manner, cycling between fill and the discharge cycles continues until the system is deactivated, as by terminating fluid pressure input through the pressure conduit 50.

Operation of the system 10 may be controlled through an instrument panel such as illustrated in FIG. 4. The instrument panel 140 may be mounted on the vessel 12, as shown in FIG. 1, and may have a main power switch 142, a blower power switch 144 for the positive displacement blower (not shown) to which pressure conduit 50 is connected, a blower energizing control switch 146 and a blower stop control switch 148. A pair of control switches 150a and 150b may also be mounted on the control panel 140 to enable selective manual control of the load and discharge cycles, respectively, the switches 150a,b being operative to control the condition of the solenoid 118 in selective override to the pressure sensor switch 130. A switch 152 may also be provided to control a separate source of air pressure (not shown) to the manifold 130 so as to assure passage of discharged material from the vessel 12 through the conduit 32.

Thus, in accordance with the present invention, a transfer system for dry flowable non-abrasive material, such as particulate or pulverulent material, is provided wherein alternate fill and discharge cycles of a substantially closed vessel are automatically established in direct relation to the efficiency of or pressure within the restricted throat of a venturi, the efficiency of the venturi being in direct relation to the amount of material within the vessel during a fill cycle. The transfer system 10 does not require or utilize timers of the type employed in known prior systems for transferring flowable material. The operation of the transfer system 10 in direct relation to air pressure within the vessel 12, and thus in direct relation to the amount of material within the vessel, may best be seen with reference to FIGS. 6 and 7 which graphically illustrate cycling of the system 10 between fill and discharge cycles in relation to the fluid pressure within the vessel 12 for conveying, respectively, particulate material in the form of plastic pellets and pulverulent material in the form of PVC powder.

FIG. 6 graphically depicts on the vertical axis pressure within vessel 12 versus time on the horizontal axis, when utilizing a fluid inlet pressure of approximately 15 psi from the pressure inlet conduit 50. Each point 158 on the graph of FIG. 6 indicates a change from a discharge cycle to a fill cycle. It is seen that the pressure curve drops below zero pressure after a fill cycle is initiated, thus indicating a reduced pressure or suction within the vessel which causes material to be drawn into the vessel through inlet 16. As the vessel fills with material, the downwardly sloping pressure curve levels off showing a relative increase in pressure in the vessel as it becomes substantially full, as represented by the curve portion 158a. As the vessel fills, material is sucked into the venturi throat through suction line or conduit 54 causing an increase in pressure within the venturi (decrease in efficiency) which is detected by the pressure switch 134 so as to cause cycle valve 46 to condition the system for a discharge cycle, as indicated at point 160. The curve shows an increase in pressure within the vessel during the discharge cycle to effect discharge of material from the vessel. As material is discharged from the vessel, the fluid pressure in vessel 12 and the extent of fluid flow through conduit 54 to the venturi begins to drop off which causes a decrease in fluid flow through the secondary port and throat of the venturi (i.e. an increase in efficiency) which is detected by the pressure switch 134 which causes the cycle valve 46 to again go to a vessel fill condition as depicted at the next point 158 on the graph. Such cyclical filling and discharging of the system transfer vessel 12 continues automatically in direct response to fluid pressure within the venturi throat until material transfer is completed or system operation is otherwise terminated.

In similar fashion, FIG. 7 graphically depicts on the vertical axis pressure within the vessel 12 versus time on the horizontal axis for fill and discharge cycles when conveying a powder or pulverulent material utilizing a fluid inlet pressure of approximately 15 psi gage. The change in each cycle from discharge to fill is indicated at 162, and the change from fill to discharge is indicated at 164. It is seen from both FIGS. 6 and 7 that alternate cycling between fill and discharge cycles is in direct response to pressure within the transfer vessel and in relation to the efficiency of the venturi. With the system 10 of the present invention, no resetting of a timer, as employed in "timed" systems, to compensate for changes in operating conditions, such as the material being handled and/or the lengths of suction lines employed, is required, thus providing significant advantages over prior transfer systems for flowable material.

While a preferred embodiment of the present invention has been illustrated and described, it will be understood that changes and modifications may be made therein without departing from the invention in its broader aspects. Various features of the invention are defined in the following claims.

What is claimed is:

1. A system for transferring dry flowable material comprising, in combination; a substantially closed vessel defining an inlet adapted to receive flowable material therein and a discharge end enabling discharge of material from said vessel, a cycle valve, a first flow conduit communicating with said cycle valve and adapted for connection to a source of pressurized fluid flow, a second flow conduit communicating with said cycle valve so as to enable selective pressurized fluid flow therethrough from said cycle valve, a third flow conduit communicating with said cycle valve and said vessel so as to enable flow of pressurized fluid from said cycle valve to said vessel, said cycle valve being selectively operable between a first condition operative to effect fluid pressure flow from said first to said second flow conduits, and a second condition operative to effect fluid pressure flow from said first to said third flow conduits so as to pressurize said vessel, means defining a venturi communicating with said second flow conduit and having a restricted throat such that fluid pressure flow through said second flow conduit passes through said venturi and normally creates a predetermined reduced pressure within the restricted throat of the venturi, a fourth flow conduit communicating with said restricted throat of said venturi means and said vessel so as to effect a suction condition within said fourth flow conduit during fluid flow through said venturi from said second conduit, and control means operatively associated with said cycle valve so as to automatically cycle said cycle valve between its said first condition wherein a suction is created within said vessel sufficient to effect filling thereof with flowable material, and its said second condition operative to introduce fluid pressure into said vessel sufficient to effect discharge of flowable material from said discharge end, said control means including a pressure responsive control switch directly communicating with said restricted throat of said venturi in a manner to detect pressure changes therein, said control means being operative in response to a first fluid pressure detected within the throat of said venturi to condition said cycle valve so as to effect filling of said vessel to an extent that flowable material is drawn through said fourth conduit into said venturi to increase the pressure within said throat, said pressure responsive switch being operative in response to a predetermined pressure increase within said venturi throat to condition said cycle valve so as to pressurize said vessel and effect discharge of material therefrom until the fluid pressure within said vessel and said fourth conduit returns the pressure in said venturi throat to said first fluid pressure therein whereby to automatically condition said cycle valve to again effect filling of said vessel.

2. A system as defined in claim 1 including an additional flow conduit connecting the discharge end of said venturi to said discharge end of said vessel, said additional conduit being in communication with said fourth flow conduit such that fluid pressure flow from said vessel to said venturi passes through said additional conduit to assist in passage of material from said discharge end of said vessel.

3. A system as defined in claim 1 including a first valve operatively associated with said inlet end of said vessel, and a second valve operatively associated with said discharge end of said vessel.

4. A system as defined in claim 3 wherein said second valve is movable between a position closing said discharge end of said vessel and a position spaced therefrom, and including means operatively associated with said second valve in a manner to enable selective limiting of the opening of said second flap valve relative to said discharge end.

5. A system as defined in claim 1 wherein said cycle valve includes at least one valve member movable to control fluid pressure communication between said first flow conduit and said second and third flow conduits, said cycle valve defining a control pressure chamber therein operatively associated with said valve member, said control means including fluid pressure control conduit means interconnecting said first flow conduit and said pressure chamber so as to enable selective introduction of fluid pressure into said pressure chamber in response to said pressure responsive control switch whereby to actuate said cycle valve between its said first and second operating conditions.

6. The system as defined in claim 5 including means biasing said valve member to a position enabling fluid pressure communication between said first and second flow conduits.

7. A system as defined in claim 5 including an electrically controlled flow control valve operatively interconnected in said control conduit means between said fluid pressure chamber and said first flow conduit, said flow control valve being operative between a first control condition interconnecting said pressure chamber to said first flow conduit and a second control condition operative to interconnect said pressure chamber to atmosphere, said pressure responsive control switch being electrically connected to said electrical flow control valve so as to effect selective actuation of said flow control valve between its said first and second control conditions in response to the fluid pressure detected within said throat of said venturi.

8. A system as defined in claim 2 including a manifold housing disposed about said discharge end of said vessel so as to establish a substantially closed housing thereabout, said additional flow conduit communicating between said venturi and said manifold housing and being operative to pass fluid pressure to said manifold housing from said fourth flow conduit during discharge of material from said vessel so as to provide fluidized intermixing of discharged material.

9. A system for transferring dry flowable material, comprising, in combination, a substantially closed vessel having an inlet and a discharge end, a cycle valve and venturi arranged between a source of fluid pressure and said vessel such that said cycle valve may be selectively actuated to pass pressurized fluid directly to the vessel or through said venturi, a suction line interconnecting said vessel to the throat section of the venturi such that passage of fluid flow through said venturi establishes a suction within said vessel, and a pressure responsive control switch having direct communication with the throat of said venturi so as to detect the fluid pressure therein, said control switch being operative in response to a predetermined pressure within the venturi to condition said cycle valve for effecting a suction within the vessel sufficient to substantially fill said vessel with material after which material is sucked into said venturi to cause a change in fluid pressure therein, said pressure responsive control switch being responsive to a predetermined change in fluid pressure in said venturi to cause said cycle valve to pressurize said vessel and effect discharge of material therefrom, said cycle valve and pressure responsive control switch being operative to effect automatic cyclical filling and discharge of said vessel.

* * * * *